(12) United States Patent
Ichinose et al.

(10) Patent No.: US 6,695,979 B2
(45) Date of Patent: Feb. 24, 2004

(54) LIQUID CRYSTALLINE MEDIUM AND LIQUID CRYSTAL DISPLAY

(75) Inventors: Hideo Ichinose, Aikawa-machi (JP); Yukiomi Tanaka, Aikawa-machi (JP); Shinji Nakajima, Aikawa-machi (JP)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 0 days.

(21) Appl. No.: 10/050,151

(22) Filed: Jan. 18, 2002

(65) Prior Publication Data

US 2002/0182345 A1 Dec. 5, 2002

(30) Foreign Application Priority Data

Jan. 19, 2001 (EP) .............................. 01101238

(51) Int. Cl.$^7$ .................. C09K 19/30; C09K 19/12; C09K 19/34
(52) U.S. Cl. .................. 252/299.63; 252/299.61; 252/299.66
(58) Field of Search .................. 252/299.66, 299.63, 252/299.61; 428/1.1

(56) References Cited

U.S. PATENT DOCUMENTS

| | | | | |
|---|---|---|---|---|
| 5,308,541 A | * | 5/1994 | Hittich et al. | 252/299.63 |
| 5,744,060 A | * | 4/1998 | Tarumi et al. | 252/299.63 |
| 2002/0060311 A1 | * | 5/2002 | Tarumi et al. | 252/299.66 |
| 2002/0061368 A1 | * | 5/2002 | Tarumi et al. | 428/1.1 |
| 2002/0093004 A1 | * | 7/2002 | Tarumi et al. | 252/299.66 |

FOREIGN PATENT DOCUMENTS

DE 19529106 * 2/1997

* cited by examiner

Primary Examiner—Shean Wu
(74) Attorney, Agent, or Firm—Millen, White, Zelano & Branigan, P.C.

(57) ABSTRACT

The instant invention relates to liquid crystal media comprising a dielectrically positive component (A), comprising compounds with high values of Δn of formula I and simultaneously a second dielectrically positive component (B), comprising one or more compounds of formula II

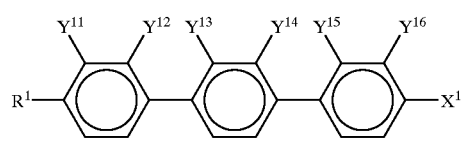

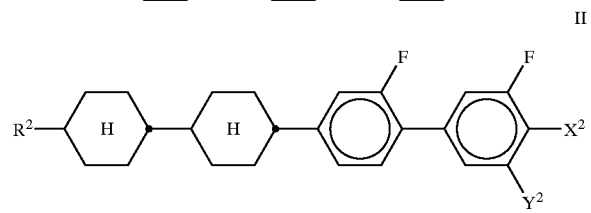

wherein the parameters are as defined in the text and to liquid crystal displays comprising these media, in particular to TN-AMD displays.

15 Claims, No Drawings

LIQUID CRYSTALLINE MEDIUM AND LIQUID CRYSTAL DISPLAY

FIELD OF THE INVENTION

The present invention relates to liquid crystalline media comprising a first dielectrically positive component (component A) comprising one or more compounds of formula I, which have high values of Δn

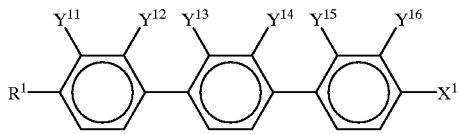

wherein
R$^1$ is n-alkyl, n-alkoxy with 1 to 7 C-atoms, alkenyl, alkenyloxy or alkoxyalkyl with 2 to 7 C-atoms,
X$^1$ is F, Cl, CF$_3$, OCF$_3$ or OCF$_2$H and
one of Y$^{11}$, Y$^{12}$, Y$^{13}$, Y$^{14}$, Y$^{15}$ and Y$^{16}$
is F and the others are independently of each other H or F, and
simultaneously
a second dielectrically positive component (component B) comprising one or more compounds of formula II

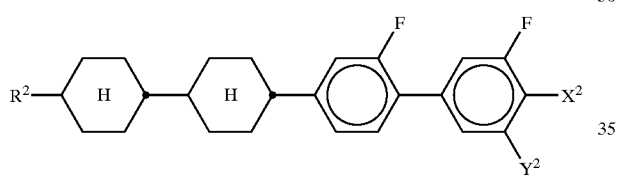

wherein
R$^2$ is n-alkyl, n-alkoxy with 1 to 7 C-atoms, alkenyl, alkenyloxy or alkoxyalkyl with 2 to 7 C-atoms,
X$^2$ is F, Cl, CF$_3$, OCF$_3$ or OCF$_2$H and
Y$^2$ H or F,
to the use of these media especially in liquid crystal displays and to LCDs comprising these media, preferably to displays of the TN mode and in particular to displays addressed by an active matrix.

PROBLEM TO BE SOLVED AND STATE OF THE ART

Liquid Crystal Displays (LCDs) are widely used to display information. They are used for direct view displays, as well as for projection type displays. Probably the most widely employed electro-optical mode still is the twisted nematic (TN)-mode. Besides this mode also other modes are already used or being investigated. Amongst the effects widely used are e.g. the super twisted nematic (STN)-effect, which is used for directly driven displays and the electrically controlled birefringence (ECB)-mode, also called vertically aligned nematic (VAN)-mode, which is used in active matrix addressed displays (AMDs), as well as their modifications. The TN-mode is beneficially used both in directly addressed displays and in AMDs.

A promising electrooptical mode for LCDs is the optically compensated bend (OCB) mode. This mode has a favorable small viewing angle dependence of the contrast. Further the response times in this mode are small.

Besides these modes, which all do use an electrical field, which is substantially perpendicular to the substrates, respectively to the liquid crystal layer, there are also electro-optical modes employing an electrical field substantially parallel to the substrates, respectively the liquid crystal layer like e.g. the in-plane switching (IPS)-mode (as disclosed e.g. in DE 40 00 451 and EP 0 588 568).

For TN-AMDs liquid crystalline media with an excellent resistivity are required. For direct view TN-AMDs with small cell gaps, as well as for reflective TN-AMDs with very small cell gaps, liquid crystalline media with higher birefringence (Δn) are required compared to commonly used direct view TN-AMDs with cell gaps of about 4 to 5 μm, operating in the first transmission minimum according to Gooch and Tarry. Especially for modern TFT driven displays with polycrystalline silicon as the active medium such media with elevated Δn are required.

Liquid crystalline media containing compounds of formula I are known from DE 195 29 106. These media, however, are characterized by a low birefringence and have a rather high threshold voltage. Liquid crystalline media containing compounds of formula II with a terminal Cl atom are known from U.S. Pat. No. 5,328,644. These media, however, are characterized by a high birefringence.

Similar media are disclosed in JP 06-264 059 (A).

Thus, there is a significant need for liquid crystalline media with suitable properties for practical applications such as a wide nematic phase range, low viscosities, especially low rotational viscosities, appropriate optical anisotropy Δn according to the display mode used especially a suitably high Δn for TN-AMDs with small cell gaps.

PRESENT INVENTION

Surprisingly, it now has been found that liquid crystal media with suitable Δn especially useful for TN-AMDs can be realized which do not exhibit the drawbacks of the materials of the prior art or at least do exhibit them to a significantly lesser degree. These improved liquid crystal media according to the instant invention are realized by using at least two components:
a first dielectrically positive liquid crystal component (called component A), comprising compounds of formula I, which are strongly dielectrically positive compounds with high values of Δn

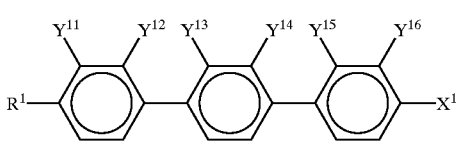

wherein
R$^1$ is n-alkyl, n-alkoxy with 1 to 7 C-atoms, preferably 2 to 5 C-atoms, alkenyl, alkenyloxy or alkoxyalkyl with 2 to 7 C-atoms,
X$^1$ is F, Cl, CF$_3$, OCF$_3$ or OCF$_2$H, preferably F or Cl, most preferably F and
one of Y$^{11}$, Y$^{12}$, Y$^{13}$, Y$^{14}$, Y$^{15}$ and Y$^{16}$
is F and the others are, independently of each other, H or F, preferably at least one of the others is F
and simultaneously a second dielectrically positive component (component B) comprising one or more compounds of formula II

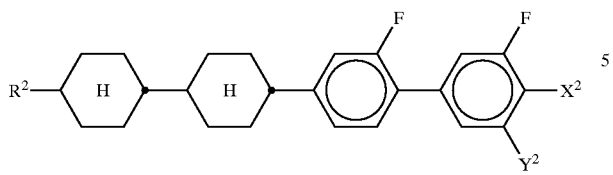

II wherein $R^2$ is n-alkyl, n-alkoxy with 1 to 7 C-atoms, preferably 2 to 5 C-atoms, alkenyl, alkenyloxy or alkoxyalkyl with 2 to 7 C-atoms, $X^2$ is F, Cl, $CF_3$, $OCF_3$ or $OCF_2H$, preferably F or Cl, most preferably F and $Y^2$ H or F, preferably F.

In a preferred embodiment, the liquid crystalline media according to the present invention comprise a further dielectrically positive component (called component C) which is comprising dielectrically positive compounds of formula III

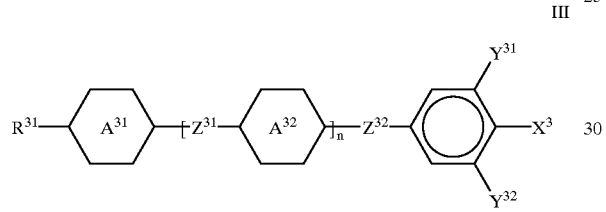

III wherein $R^{31}$ and $R^{32}$ independently of each other, have the meaning given for $R^1$ under formula I above, $Z^{31}$ and $Z^{32}$ are, independently of each other, —$CH_2CH_2$—, —COO—, trans- CH=CH—, trans- —CF=CF—, —$CH_2O$—, —$CF_2O$— or a single bond, if both are present, preferably at least one of them is a single bond,

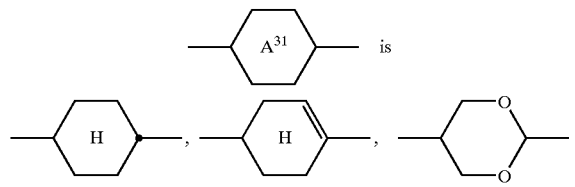

or their mirror images,

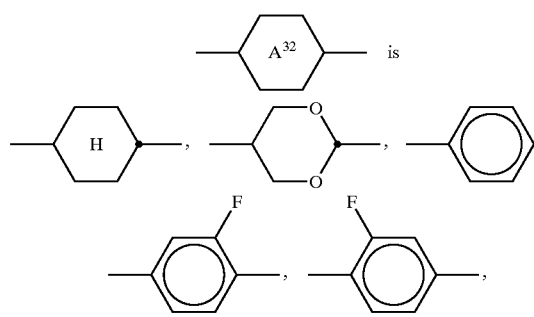

-continued

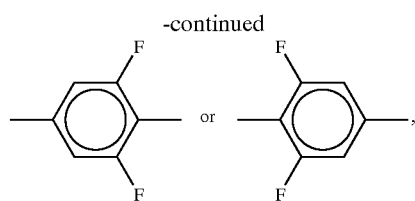

$X^3$ is F, Cl, halogenated alkyl, halogenated alkenyl or halogenated alkoxy, each having 1 to 6 C atoms, preferably F, Cl, $OCF_3$ or $OCF_2H$ and n is 0 or 1, preferably $Z^{31}$ and $Z^{32}$ Z are, independently of each other, —$CH_2CH_2$—, —COO—, trans- CH=CH—, —$CF_2O$— or a single bond, if both are present, preferably at least one of them is a single bond, and/or preferably

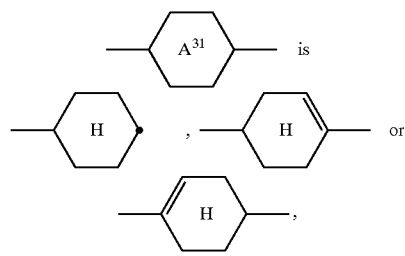

and/or preferably

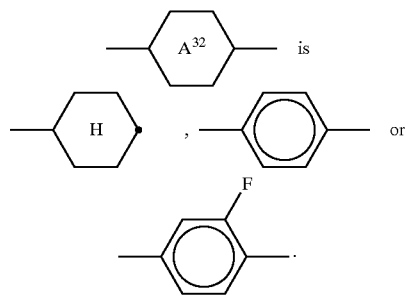

In yet a further preferred embodiment, the liquid crystalline media according to the present invention additionally comprise a dielectrically neutral component (called component D) which is comprising dielectrically neutral compounds of formula IV

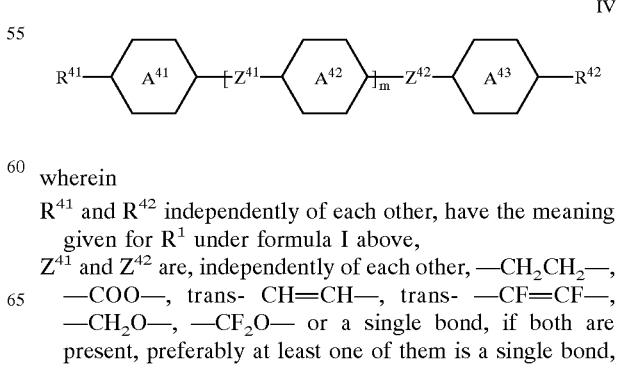

IV wherein $R^{41}$ and $R^{42}$ independently of each other, have the meaning given for $R^1$ under formula I above, $Z^{41}$ and $Z^{42}$ are, independently of each other, —$CH_2CH_2$—, —COO—, trans- CH=CH—, trans- —CF=CF—, —$CH_2O$—, —$CF_2O$— or a single bond, if both are present, preferably at least one of them is a single bond,

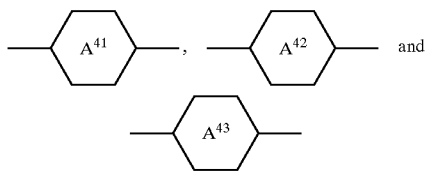

each have the meaning given for

above under formula I and
m is 0, 1 or 2.

Preferably the liquid crystalline media according to the instant invention contain a component A comprising, preferably predominantly consisting of and most preferably entirely consisting of, one or more compounds of formula I.

Comprising in this application means in the context of compositions, that the entity referred to, e.g. the medium or the component, contains the compound or compounds in question, preferably in a total concentration of 10% or more and most preferably of 20% or more.

Predominantly consisting, in this context, means that the entity referred to contains 80% or more, preferably 90% or more and most preferably 95% or more of the compound or compounds in question.

Entirely consisting, in this context, means that the entity referred to contains 98% or more, preferably 99% or more and most preferably 100.0% of the compound or compounds in question.

The compounds of formula I are preferably selected from the group of sub-formulae I-1 to I-3

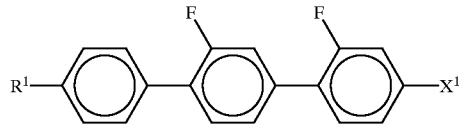

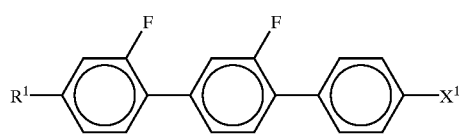

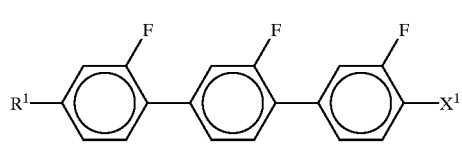

wherein $R^1$ and $X^1$ have the respective meanings given under formula I above.

Especially preferred are media comprising compounds selected from the group of sub-formulae I-1a, I-1b, I-2a and I-2b

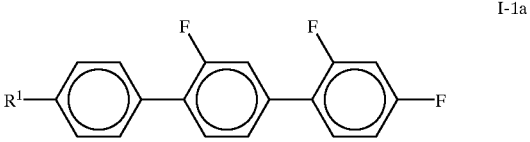

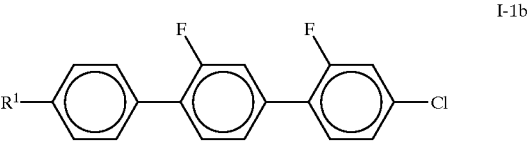

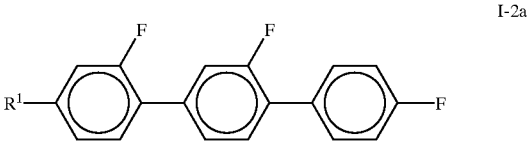

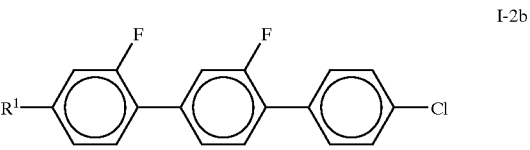

wherein $R^1$ has the meaning given under formula I above.

In a preferred embodiment the liquid crystalline media according to the instant invention contains a component B comprising, preferably predominantly consisting of and most preferably entirely consisting of, compounds of formula II.

The compounds of formula II are preferably selected from the group of sub-formulae II-1 to II-7

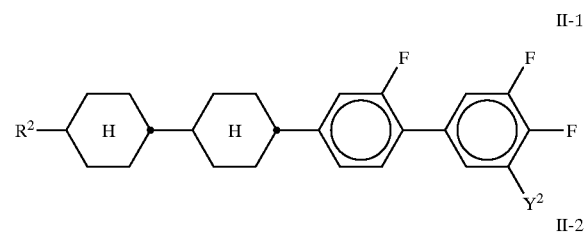

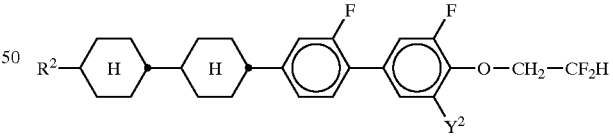

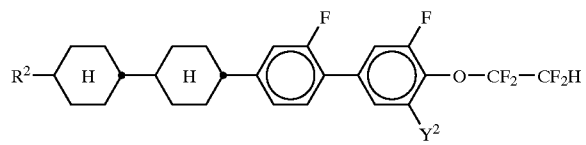

II-5
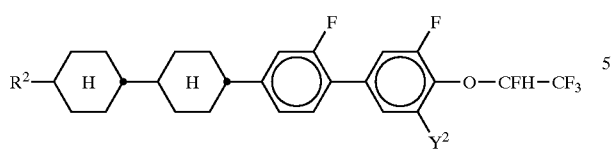

II-6
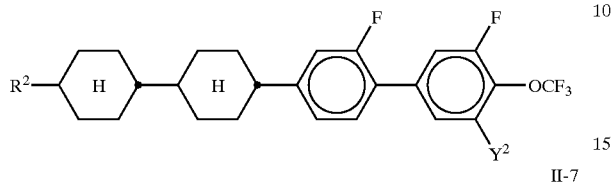

II-7
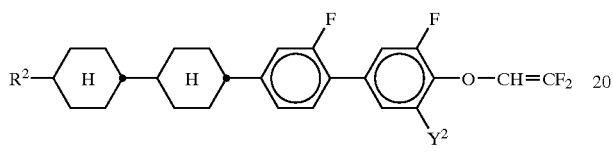

wherein
$R^2$ and $Y^2$ have the respective meanings given under formula II above.

Especially preferred are media comprising compounds selected from the group of sub-formulae II-1a, II-1b, II-6a and II-6b II-1a
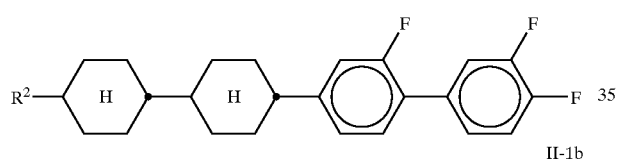

II-1b
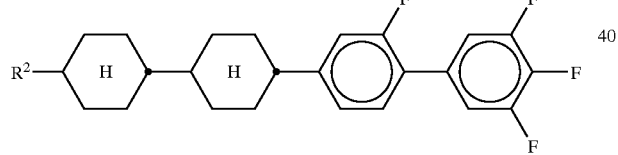

II-6a
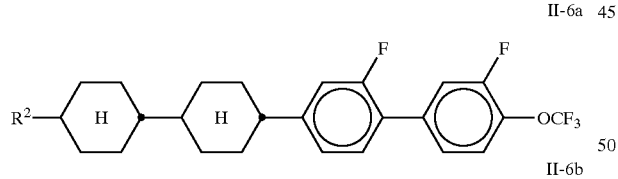

II-6b
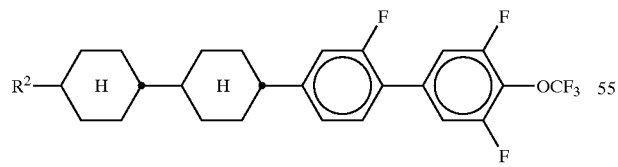

wherein
$R^2$ has the meaning given under formula II above.

In a further preferred embodiment the liquid crystal medium contains a dielectric positive liquid crystal component (component C) which is preferably predominantly consisting of and most preferably entirely consisting of compounds of formula III as given above.

The compounds of formula III are preferably selected from the group of sub-formulae III-1 to III-12

III-1
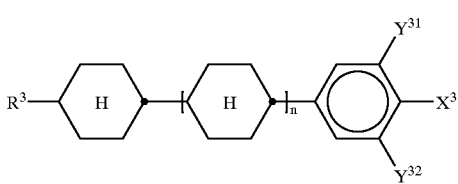

III-2
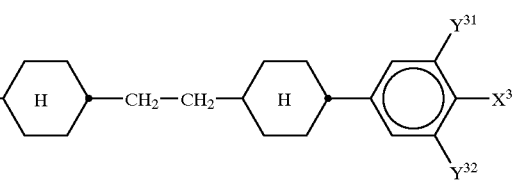

III-3
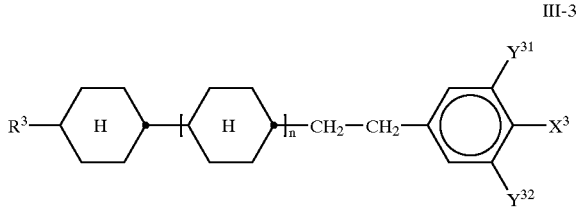

III-4
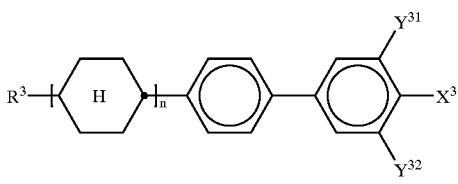

III-5
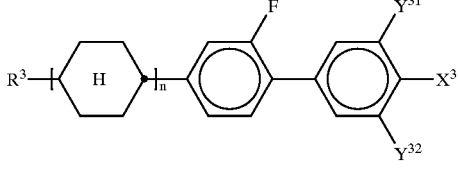

III-6
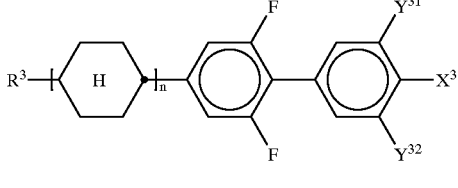

III-7
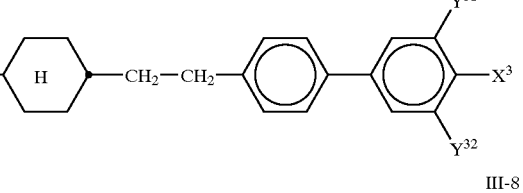

III-8
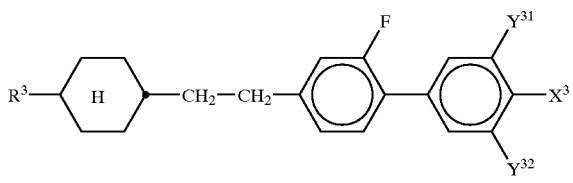

-continued

III-9
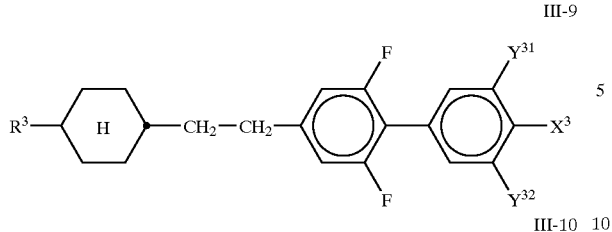

III-10
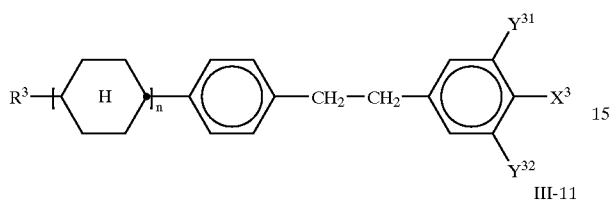

III-11
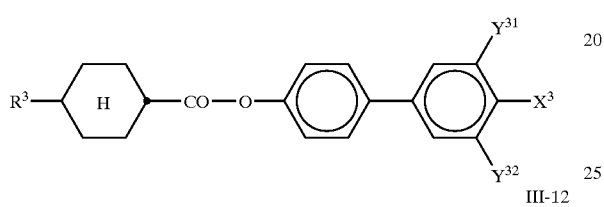

III-12
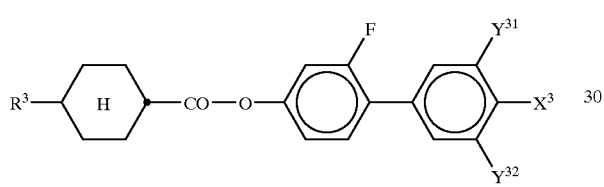

wherein
$R^3$ has the meaning given under formula III above,
$Y^{31}$ and $Y^{32}$ are independently of each other H or F and,
$X^3$ has the meaning given under formula III above and is preferably F, $OCF_3$ or $OCF_2H$ and
n is 0 or 1.

This component C may be present, and preferably is present, besides component B.

Especially preferred are media comprising compounds selected from the group of sub-formulae III-1a to III-1h and III-2 to III-10

III-1a

III-1b
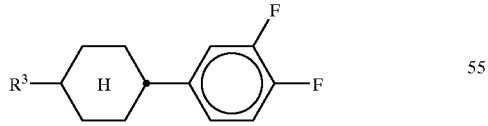

III-1c
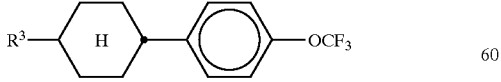

III-1d
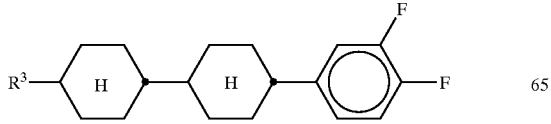

-continued

III-1e
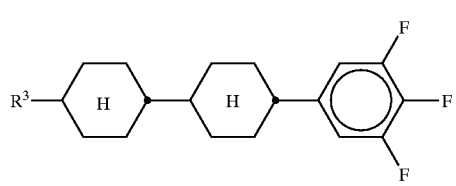

III-1f
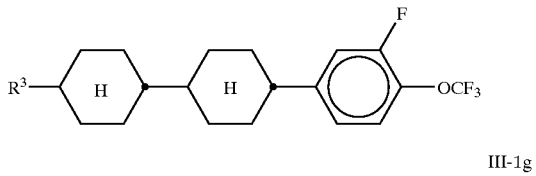

III-1g
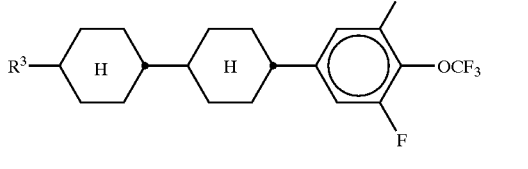

III-1h
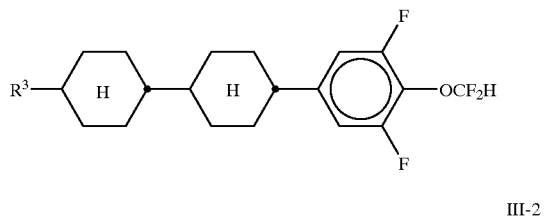

III-2
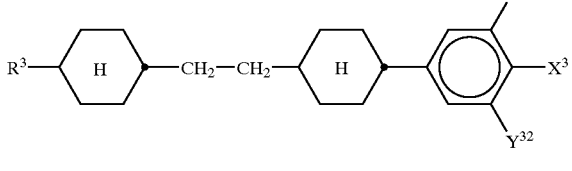

III-3
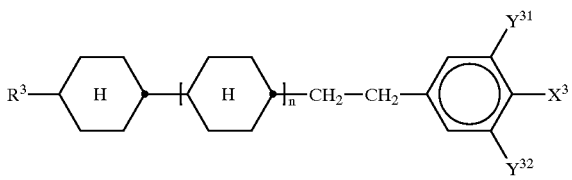

III-4
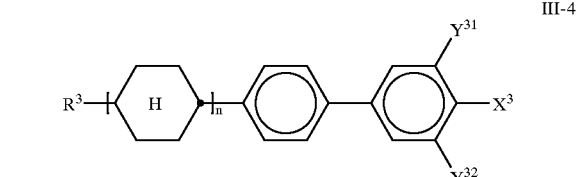

III-5
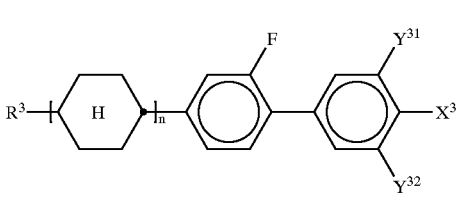

-continued

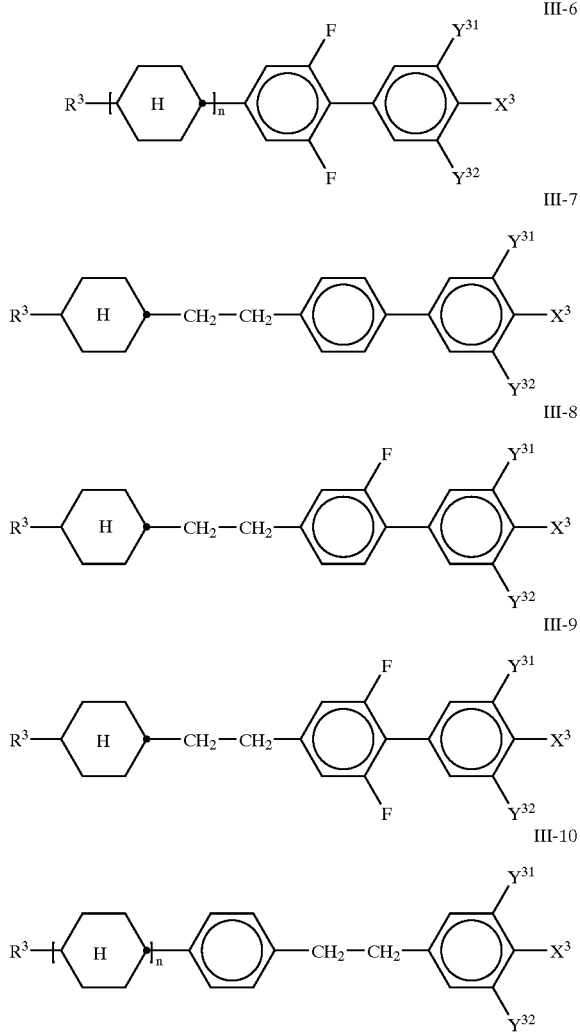

wherein the parameters have the meaning given under formula III above.

In a further preferred embodiment the liquid crystal medium contains a dielectric positive liquid crystal component (component D) which is preferably predominantly consisting of and most preferably entirely consisting of compounds of formula IV as given above.

The compounds of formula IV are preferably selected from the group of sub-formulae IV-1 to IV-4

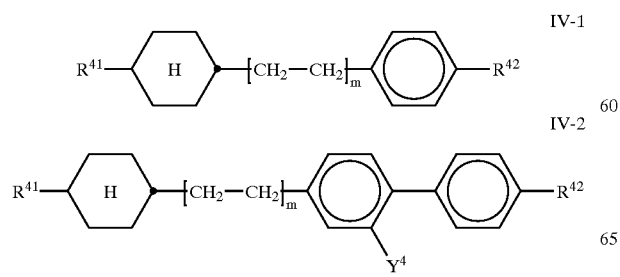

wherein
$R^{41}$, $R^{42}$ and m have the respective meanings given under formula IV above and $Y^4$ is H or F.

Most preferably the medium contains compounds of formula I selected from the group of sub-formulae I-1 to I-3. Most prefered of these are compounds of sub-formulae I-1a, I-1b, I-2a, I-2b, I-3a and I-3b
wherein
$R^1$ has the meaning given under formula I above and preferably is n-alkyl with 1 to 5 C-atoms or n-alkoxy with 1 to 4 C-atoms, or 1-E-alkenyl with 2 to 5 C-atoms.

Most prefered the media contain compounds selected from the group of formulae I-1a, I-1b and I-2a and particularly preferred from the group of formulae I-1a and I-2a.

Preferably the media contain compounds selected from the group of formulae III-4a to III-4d and III-5a to III-5c, preferably one or more compounds selected from the group of formulae III-4a to III-4d and one or more compounds selected from the group of formulae III-5a to III-5c

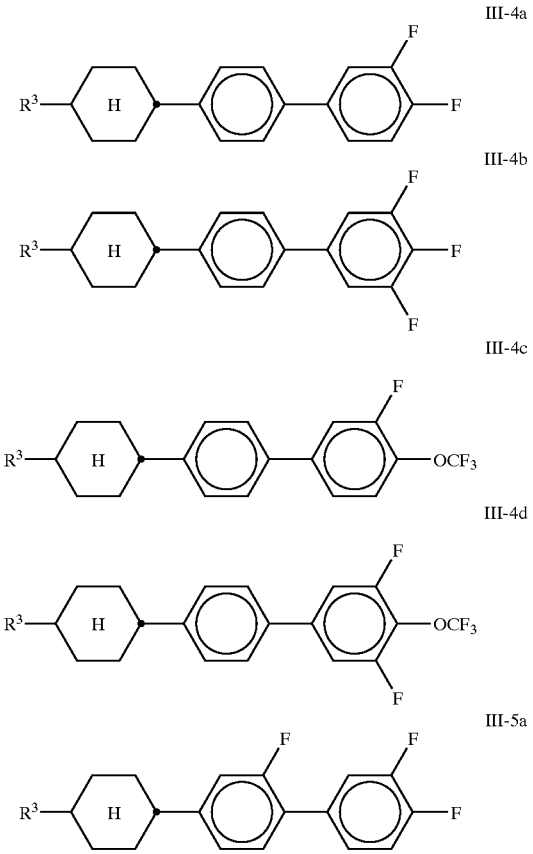

-continued

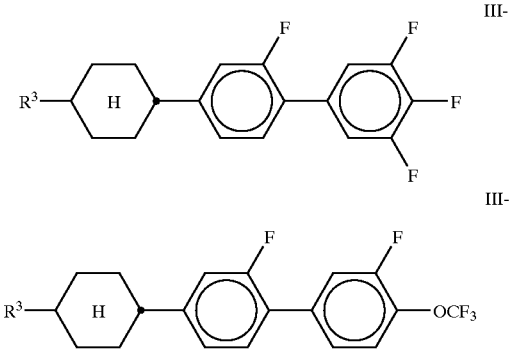

III-5b

III-5c wherein R³ has the meaning given under the formula III-4 above.

Component A is preferably used in a concentration of from 1 to 55%, more preferably from 3 to 40% and most preferably from 5 to 30% of the total mixture, by weight.

Component B is preferably used in a concentration from 1 to 45%, more preferably from 3 to 35% and most preferably from 5 to 25% of the total mixture by weight.

Component C is preferably used in a concentration from 0 to 85%, more preferably from 20 to 80% and most preferably from 40 to 75% of the total mixture.

Component D is preferably used in a concentration from 0 to 35%, more preferably from 1 to 25% and most preferably from 11 to 19% of the total mixture.

Optionally, the inventive media can comprise further liquid crystal compounds in order to adjust the physical properties. These further compounds are used to adjust especially the phase range, the optical anisotropy and the operating voltage of the inventive liquid crystal media. Such compounds are known to the expert. Their concentration in the media according to the instant invention is preferably 0% to 30%, more preferably 0% to 20% and most preferably 0% to 15%.

Preferably the liquid crystal medium contains 50% to 100%, more preferably 70% to 100% and most preferably 80% to 100% and in particular 90% to 100% totally of components A, B, C and D, which contain, preferably predominantly consist of and most preferably entirely consist of one or more of compounds of formulae I, II, III, and IV, respectively.

The liquid crystal media according to the instant invention are characterized by a clearing point above 80° C., preferably of 90° C. or more, especially preferred of 100° C. or more and in particular of 110° C. or more.

The Δn of the liquid crystal media according to the instant invention is 0.12 or more, preferably in the range of 0.13 to 0.25, more preferably in the range of 0.14 to 0.22, most preferably in the range of 0.14 to 0.20 and in particular in the range of 0.145 to 0.170.

The dielectrical anisotropy (Δε) of the liquid crystalline media according to the invention, at 1 kHz and 20° C., preferably is 6 or more, more preferably 9 or more, most preferably 10 or more and in particular 12 or more.

The threshold voltage ($V_{10}$) of the liquid crystalline media according to the invention, at 50 Hz and 20° C., preferably is 2.0 V or less, more preferably 1.7 V or less, most preferably 1.6 V or less and in particular 1.5 V or less. Preferably it is in the range from 1.2 to 1.6 V, most preferably in the range from 1.3 to 1.5 V.

Preferably the nematic phase of the inventive media extends at least from −20° C. to 70° C., more preferably at least from −30° C. to 80° C. and most preferably at least from −40° C. to 80° C., wherein at least means that preferably the lower limit is under cut, wherein the upper limit is surpassed.

In the present application the term dielectrically positive compounds describes compounds with Δε>1,5, dielectrically neutral compounds are compounds with −1,5≦Δε≦1,5 and dielectrically negative compounds are compounds with Δε<−1,5. The same holds for components. Δε is determined at 1 kHz and 20° C. The dielectrical anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 10 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the end points of the ranges, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm. The dielectric anisotropy (Δε) is determined at a frequency of 1 kHz. The threshold voltages, as well as all other electro-optical properties have been determined with test cells prepared at Merck KGaA, Germany. The test cells for the determination of Δε had a cell gap of 22 μm. The electrode was a circular ITO electrode with an area of 1.13 cm² and a guard ring. The orientation layers were lecithin for homeotropic orientation ($ε_∥$) and polyimide AL-1054 from Japan Synthetic Rubber for homogeneous orientation ($ε_⊥$). The capacities were determined with a frequency response analyser Solatron 1260 using a sine wave with a voltage of 0.3 $V_{rms}$. The light used in the electro-optical measurements was white light. The set up used was a commercially available equipment of Otsuka, Japan. The characteristic voltages have been determined under perpendicular observation. The threshold ($V_{10}$)—mid grey ($V_{50}$)—and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1 to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 6 to 40, more preferably of 8 to 30 and most preferably of 10 to 20 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB- or VAN-AMD IPS and OCB LCDs and also in composite systems, like PDLC-LCDs and especially in HPDLCs.

The melting point T(C,N), the transition from the smectic (S) to the nematic (N) phase T(S,N) and the clearing point T (N,I) of the liquid crystals are given in degrees centigrade.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m C-atoms. The interpretation of table B is self evident. Table A does only list the abbreviations for the cores of the structures. The individual compounds are denoted by the abbreviation of the core followed by a hyphen and a code specifying the substituents $R^1$, $R^2$, $L^2$ and $L^2$ follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| nCF$_3$ | $C_nH_{2n+1}$ | CF$_3$ | H | H |
| nCF$_3$.F | $C_nH_{2n+1}$ | CF$_3$ | H | F |
| nCF$_3$.F.F | $C_nH_{2n+1}$ | CF$_3$ | F | F |

-continued

| Code for $R^1$, $R^2$, $L^1$, $L^2$ | $R^1$ | $R^2$ | $L^1$ | $L^2$ |
|---|---|---|---|---|
| nOCF$_3$ | $C_nH_{2n+1}$ | OCF$_3$ | H | H |
| nOCF$_3$.F | $C_nH_{2n+1}$ | OCF$_3$ | H | F |
| nOCF$_3$.F.F | $C_nH_{2n+1}$ | OCF$_3$ | F | F |
| nOCF$_2$ | $C_nH_{2n+1}$ | OCHF$_2$ | H | H |
| nOCF$_2$.F | $C_nH_{2n+1}$ | OCHF$_2$ | H | F |
| nOCF$_2$.F.F | $C_nH_{2n+1}$ | OCHF$_2$ | F | F |
| nS | $C_nH_{2n+1}$ | NCS | H | H |
| nS.F | $C_nH_{2n+1}$ | NCS | H | F |
| nS.F.F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | COOC$_m$H$_{2m+1}$ | H | H |

TABLE A

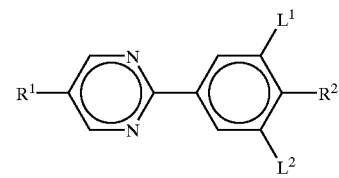

PYP

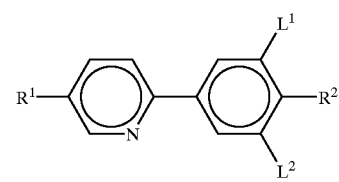

PYRP

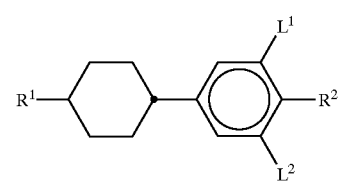

PCH

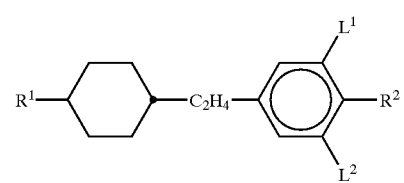

EPCH

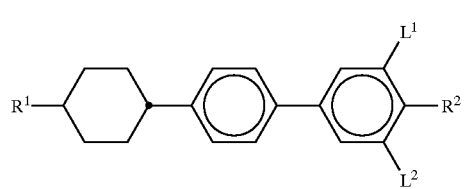

BCH

TABLE A-continued
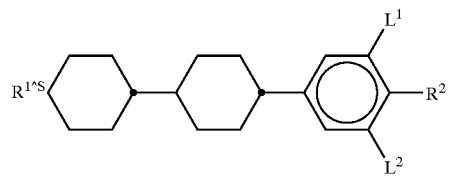
CCP
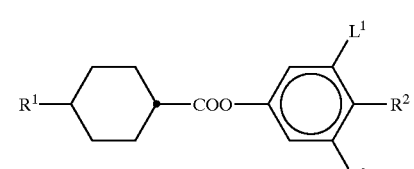
EBCH
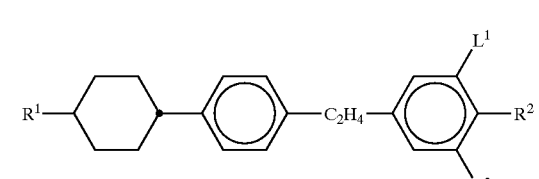
BECH
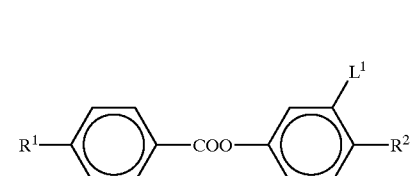
PTP
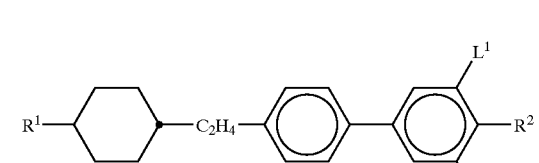
CPTP
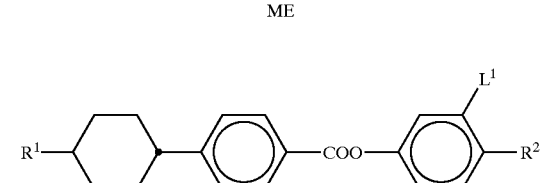
CEPTP
TABLE A-continued
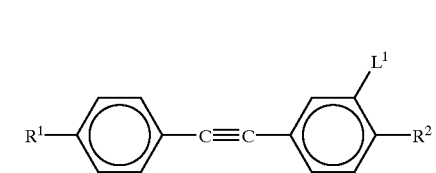
D
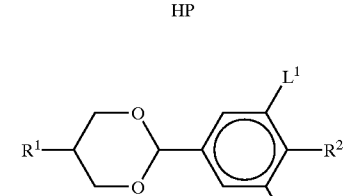
ME
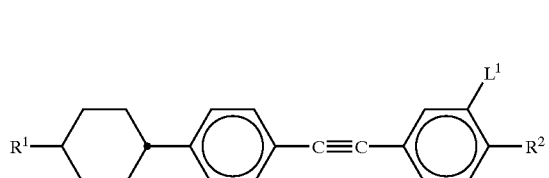
HP
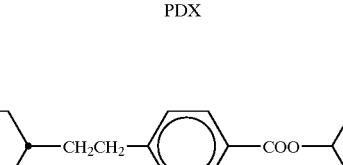
PDX
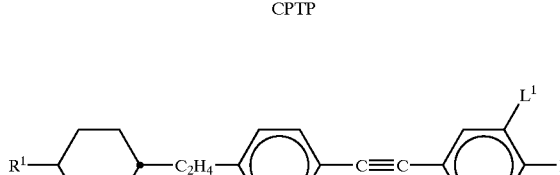
EHP
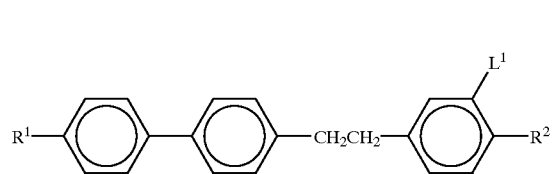
ET TABLE B
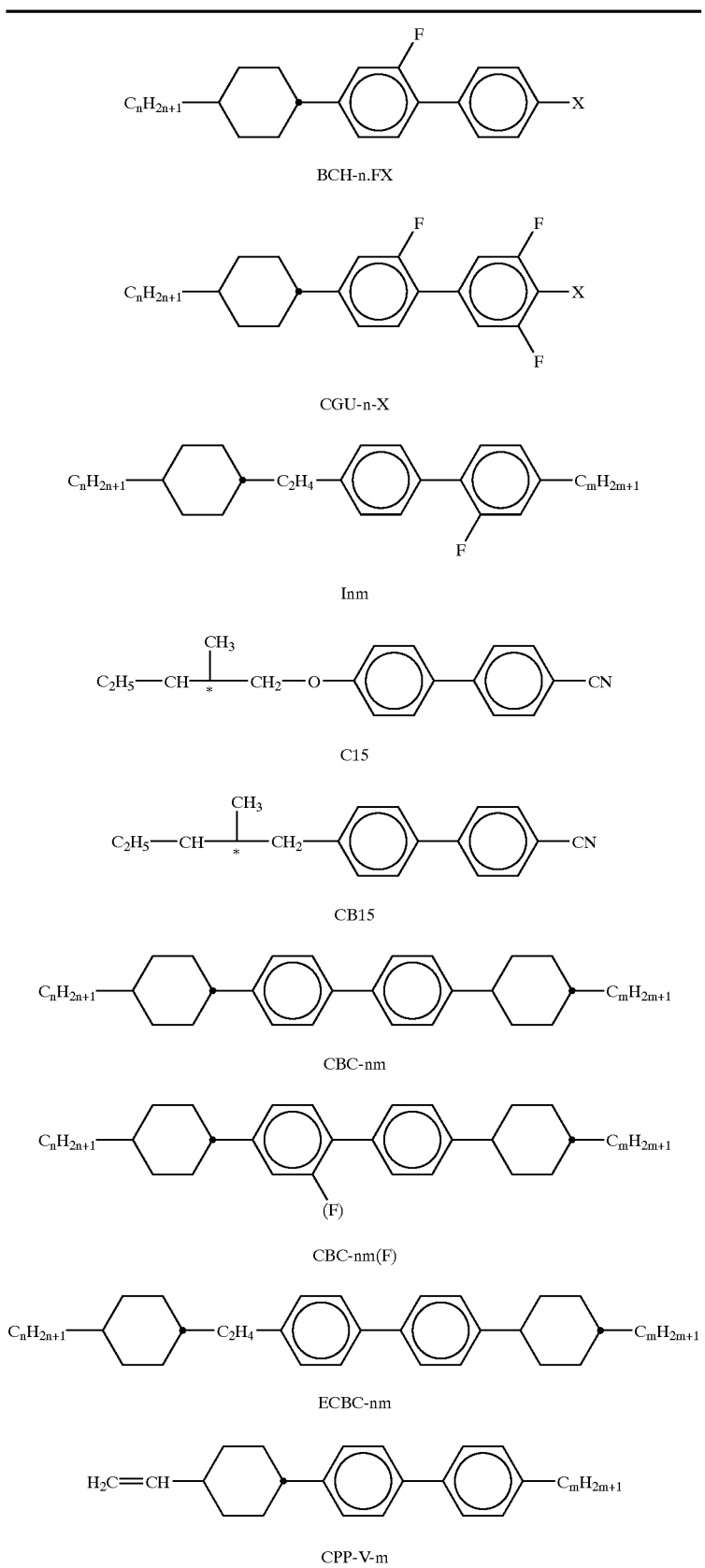

TABLE B-continued

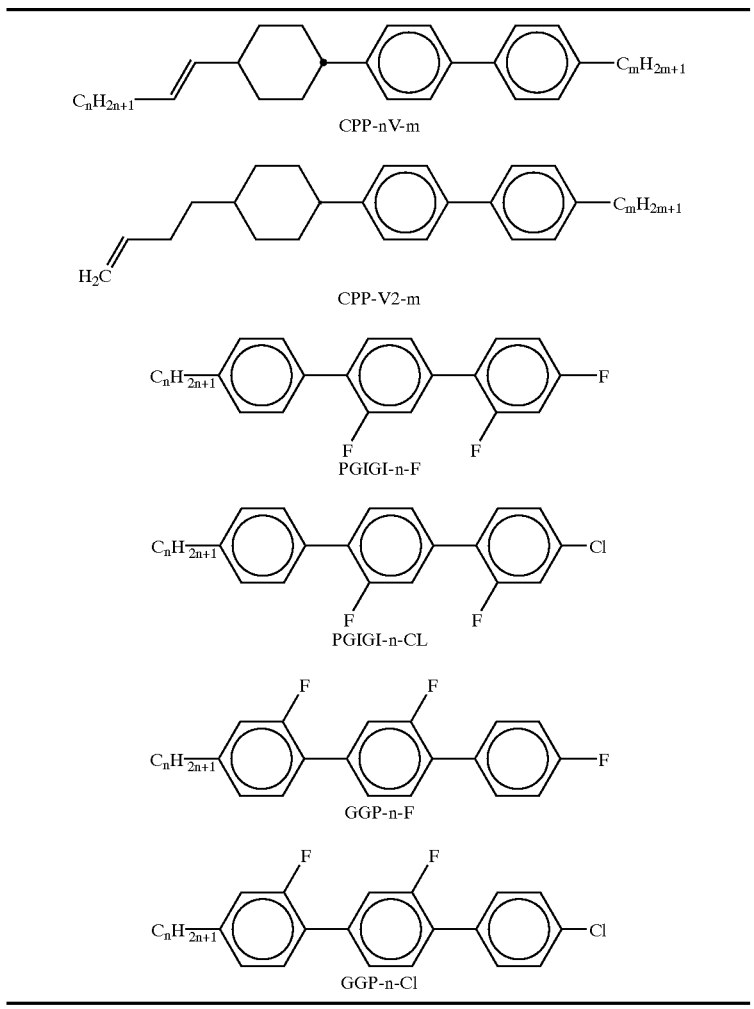

The liquid crystal media according to the instant invention do contain preferably
nine or more, preferably eleven or more, compounds selected from the group of compounds of tables A and B
and/or
four or more, preferably five or more, compounds selected from the group of compounds of table A and/or
five or more, preferably eight or more, compounds selected from the group of compounds of table A.

The entire disclosure[s] of all applications, patents and publications, cited above or below, and of corresponding Application No. EP 01101238.2, filed Jan. 19, 2001, are/is hereby incorporated by reference.

EXAMPLES

The examples given in the following are illustrating the present invention without limiting it in any way.

However, the phyiscal data especially of the compounds illustrate to the expert which properties can be achieved in which ranges. Especially the combination of the various properties which can be preferably achieved is thus well defined.

Example 1

A liquid crystal mixture is realized with the composition and properties given in the following table.

TABLE 1

| Composition | |
|---|---|
| Compound Abbreviation | Conc./% |
| PGIGI-3-F | 6.0 |
| CCGU-3-F | 6.0 |
| CCP-3F.F.F | 5.0 |
| BCH-2F.F | 12.0 |
| BCH-3F.F | 12.0 |
| BCH-5F.F | 12.0 |
| BCH-5F.F.F | 11.0 |
| CGU-3-F | 12.0 |
| CGU-5-F | 12.0 |
| BCH-32 | 4.0 |
| CBC-33F | 4.0 |
| CBC-53F | 4.0 |
| Σ | 100.0 |
| Physical Properties | |
| T (N,I) = | 98.0° C. |
| $n_e$ (20° C., 589.3 nm) = | 1.6454 |
| Δn (20° C., 589.3 nm) = | 0.1428 |

TABLE 1-continued

| | |
|---|---|
| Twist = | 90° |
| d · Δn (20° C., 589.3 nm) = | 0.55 μm |
| $V_{10}$ (20° C.) = | 1.37 V |
| $V_{50}$ (20° C.) = | 1.70 V |
| $V_{90}$ (20° C.) = | 2.14 V |

Example 2

A liquid crystal mixture is realized with the composition and properties given in the following table.

TABLE 2

| Composition | |
|---|---|
| Compound Abbreviation | Conc./% |
| PGIGI-3-F | 4.0 |
| CCGU-2-F | 4.0 |
| CCGU-3-F | 4.0 |
| CCGU-5-F | 4.0 |
| BCH-2F.F | 10.0 |
| BCH-3F.F | 10.0 |
| BCH-5F.F | 10.0 |
| BCH-3F.F.F | 12.0 |
| BCH-5F.F.F | 10.0 |
| CGU-3-F | 12.0 |
| BCH-32 | 5.0 |
| BCH-32F | 5.0 |
| BCH-52F | 5.0 |
| CBC-33F | 3.0 |
| CBC-53F | 2.0 |
| Σ | 100.0 |

| Physical Properties | |
|---|---|
| T (N,I) = | 108.0° C. |
| T (S,N) < | −40° C. |
| $n_e$ (20° C., 589.3 nm) = | 1.6527 |
| Δn (20° C., 589.3 nm) = | 0.1487 |
| Twist = | 90° |
| d · Δn (20° C., 589.3 nm) = | 0.55 μm |
| $V_{10}$ (20° C.) = | 1.50 V |
| $V_{50}$ (20° C.) = | 1.85 V |
| $V_{90}$ (20° C.) = | 2.29 V |

Example 3

A liquid crystal mixture is realized with the composition and properties given in the following table.

TABLE 3

| Composition | |
|---|---|
| Compound Abbreviation | Conc./% |
| PGIGI-3-F | 7.5 |
| CCGU-3-F | 6.0 |
| BCH-2F.F | 12.0 |
| BCH-3F.F | 12.0 |
| BCH-5F.F | 12.0 |
| BCH-3F.F.F | 4.0 |
| BCH-5F.F.F | 11.0 |
| CGU-3-F | 14.0 |
| CGU-5-F | 8.0 |
| CBC-33 | 4.0 |
| CBC-53 | 3.5 |
| CBC-33F | 6.0 |
| Σ | 100.0 |

TABLE 3-continued

| Physical Properties | |
|---|---|
| T (N,I) = | 111.0° C. |
| $n_e$ (20° C., 589.3 nm) = | 1.6534 |
| Δn (20° C., 589.3 nm) = | 0.1496 |
| Twist = | 90° |
| d · Δn (20° C., 589.3 nm) = | 0.55 μm |
| $V_{10}$ (20° C.) = | 1.40 V |
| $V_{50}$ (20° C.) = | 1.77 V |
| $V_{90}$ (20° C.) = | 2.23 V |

The voltage holding ratio of this mixture as such and with a UV stabilizer (Tinuvin) has been determined in a TN test cell at a temperature of 20° C. after different times of irradiation with UV radiation from a Xenon lamp. The results are given in the following table.

TABLE 4

| Mixture of | Example 3 | | Example 4 | |
|---|---|---|---|---|
| c(Tinuvin)/% | 0 | 0.2 | 0 | 0.2 |
| t(UV)/h | HR(20° C.)/% | | | |
| 0 | 99.9 | 99.9 | 99.8 | 99.8 |
| 24 | 99.5 | 99.7 | 98.4 | 99.2 |
| 48 | 94 | 98 | 64 | 96 |
| 72 | 86 | 96 | 50 | 90 |
| 120 | 63 | 89 | 30 | 78 |

Example 4

A liquid crystal mixture is realized with the composition and properties given in the following table.

TABLE 5

| Composition | |
|---|---|
| Compound Abbreviation | Conc./% |
| PGIGI-3-CL | 5.0 |
| CCGU-3-F | 6.0 |
| BCH-2F.F | 12.0 |
| BCH-3F.F | 12.0 |
| BCH-5F.F | 12.0 |
| BCH-3F.F.F | 4.0 |
| BCH-5F.F.F | 11.0 |
| CGU-3-F | 14.0 |
| CGU-5-F | 8.0 |
| BCH-32 | 6.0 |
| CBC-33 | 4.0 |
| CBC-33F | 6.0 |
| Σ | 100.0 |

| Physical Properties | |
|---|---|
| T (N,I) = | 110.0° C. |
| $n_e$ (20° C., 589.3 nm) = | 1.6559 |
| Δn (20° C., 589.3 nm) = | 0.1512 |
| Twist = | 90° |
| d · Δn (20° C., 589.3 nm) = | 0.55 μm |
| $V_{10}$ (20° C.) = | 1.42 V |
| $V_{50}$ (20° C.) = | 1.81 V |
| $V_{90}$ (20° C.) = | 2.30 V |

Like in example 3, the voltage holding ratio of this mixture as such and with a UV stabilizer has been determined in a TN test cell at a temperature of 20° C. after different times of irradiation with UV radiation. The results are given in the table 4, too.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid crystal medium, which comprises a first component (A) comprising one or more dielectrically positive compounds with high values of Δn of formula I:

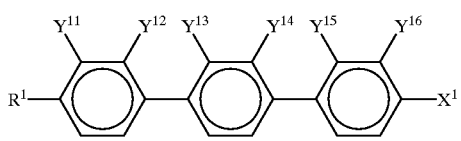

wherein
$R^1$ is n-alkyl or n-alkoxy with 1 to 7 C-atoms, or alkenyl; alkenyloxy or alkoxyalkyl with 2 to 7 C-atoms,
$X^1$ is F, and
$Y^{11}$, $Y^{12}$, $Y^{13}$, $Y^{14}$, $Y^{15}$ and $Y^{16}$ are, independently of each other, H or F, provided that at least one of $Y^{13}$ and $Y^{15}$ is F,
and simultaneously a second component (B) comprising one or more compounds of formula II:

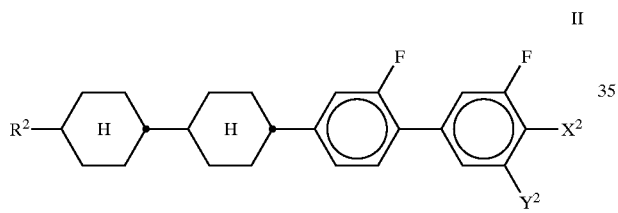

wherein
$R^2$ is n-alkyl or n-alkoxy with 1 to 7 C-atoms, or alkenyl, alkenyloxy or alkoxyalkyl with 2 to 7 C-atoms,
$X^2$ is F, Cl, $CF_3$, $OCF_3$ or $OCF_2H$, and
$Y^2$ H or F.

2. A liquid crystal medium according to claim 1, further comprising a dielectrically positive component, (C), which is comprised of at least one dielectrically positive compound of formula III:

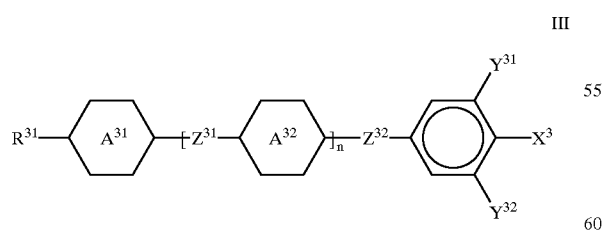

wherein
$R^{31}$ and $R^{32}$ independently of each other, have the meaning given for $R^1$ under formula I above,
$Y^{31}$ and $Y^{32}$ are, independently of each other, H or F,
$Z^{31}$ and $Z^{32}$ are, independently of each other, —$CH_2CH_2$—, —COO—, trans —CH=CH—, trans —CF=CF—, —$CH_2O$—, —$CF_2O$— or a single bond,

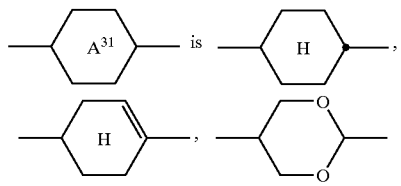

or their mirror images,

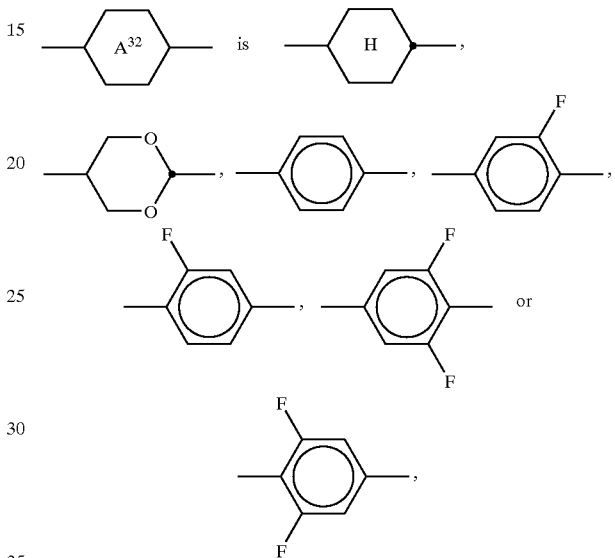

$X^3$ is F, Cl, halogenated alkyl, halogenated alkenyl or halogenated alkoxy, each having 1 to 6 C atoms, and
n is 0 or 1.

3. A liquid crystal medium according to claim 1, additionally comprising a dielectrically neutral component (D) comprising one or more compounds of formula IV:

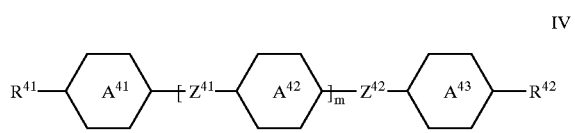

wherein
$R^{41}$ and $R^{42}$ independently of each other, have the meaning given for $R^1$ under formula I above,
$Z^{41}$ and $Z^{42}$ are, independently of each other, —$CH_2CH_2$—, —COO—, trans —CH=CH—, trans —CF=CF—, —$CH_2O$—, —$CF_2O$— or a single bond, if both are present,

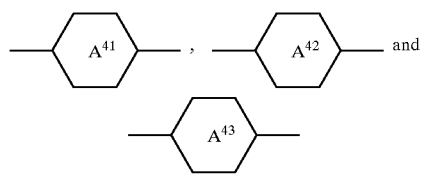

each is

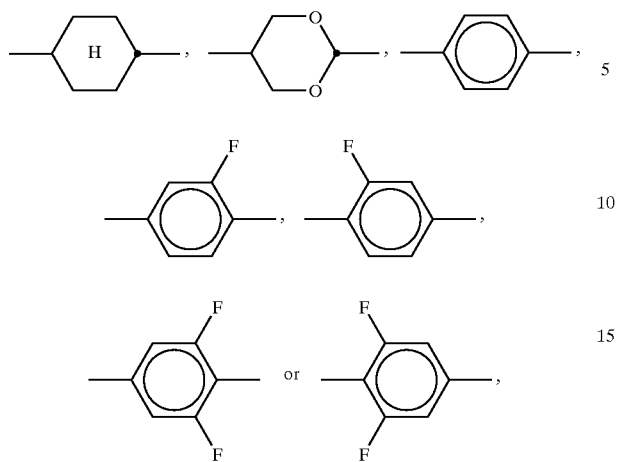

and m is 0, 1 or 2.

4. A liquid crystal medium according to claim 2, additionally comprising a dielectrically neutral component (D) comprising one or more compounds of formula IV:

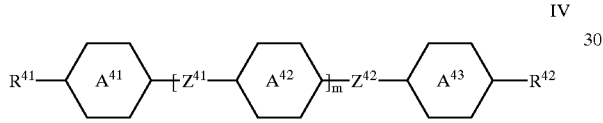

IV wherein

R$^{41}$ and R$^{42}$ independently of each other, have the meaning given for R$^1$ under formula I above, Z$^{41}$ and Z$^{42}$ are, independently of each other, —CH$_2$CH$_2$—, —COO—, trans —CH=CH—, trans —CF=CF—, —CH$_2$O—, —CF$_2$O— or a single bond, if both are present,

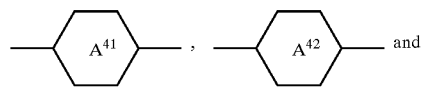

each have the meaning given for

above and m is 0, 1 or 2.

5. A liquid crystal medium according to claim 1, further comprising one or more compounds selected from the group of compounds of the formulae I-1 and I-2:

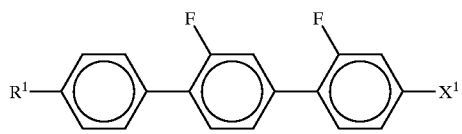

I-1

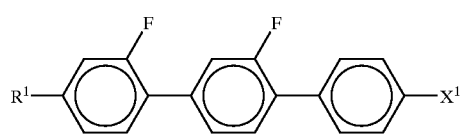

I-2 wherein

R$^1$ has the above meaning and X$^1$ is F, Cl, CF$_3$, OCF$_3$ or OCF$_2$H.

6. A liquid crystal medium according to claim 4, further comprising one or more compounds selected from the group of compounds of the formulae I-1 and I-2:

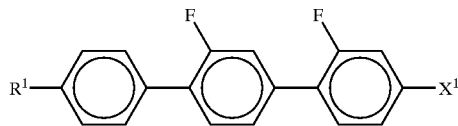

I-1

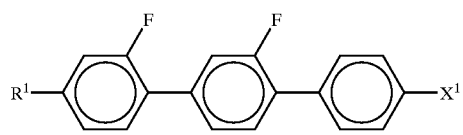

I-2 wherein

R$^1$ has the above meaning and X$^1$ is F, Cl, CF$_3$ OCF$_3$ or OCF$_2$H.

7. A liquid crystal medium according to claim 1, wherein one or more compounds of formula II are selected from the group of compounds of the formulae II-1 and II-6:

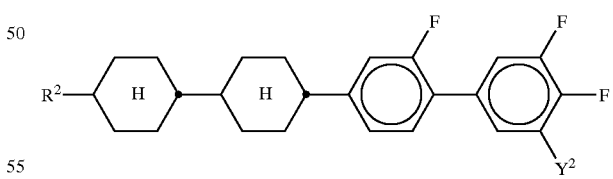

II-1

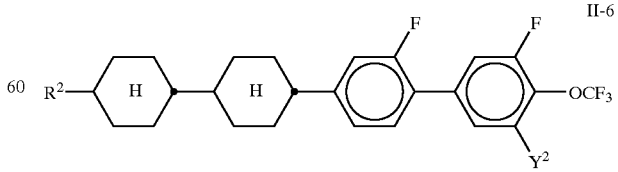

II-6 wherein

R$^2$ and Y$^2$ have the meanings given above.

8. Liquid crystal medium according to claim 2, wherein component C comprises one or more compounds selected from the group of compounds of the formulae III-4, III-5 and III-6:

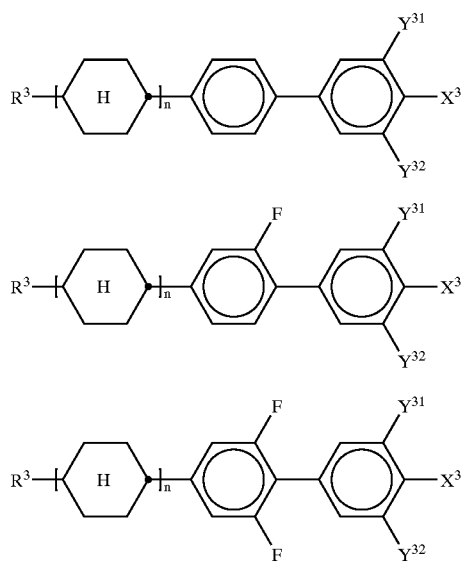

wherein
R³, independently, has the meaning given for $R^{31}$ above and $X^3$, $Y^{31}$, $Y^{32}$ and n have the respective meanings given above.

9. A liquid crystal display, comprising a liquid crystal medium according to claim 1.

10. A liquid crystal display according to claim 9, which operates in the TN mode.

11. A liquid crystal display according to claim 9, which is addressed by an active matrix.

12. A liquid crystal medium of claim 3, which comprises at least one compound of formula IV where at least one of $Z^{41}$ and $Z^{42}$ is a single bond.

13. A liquid crystal medium of claim 4, which comprises:
   3 to 40% by weight of component A,
   3 to 35% by weight of component B,
   20 to 80% by weight of component C, and
   1 to 25% by weight of component D.

14. A liquid crystal medium of claim 1, which has a Δn of 0.12 or more.

15. A liquid crystal medium of claim 1, wherein the medium comprises at least one compound of formula I wherein both of $Y^{13}$ and $Y^{15}$ are F.

* * * * *